(12) United States Patent
Otto et al.

(10) Patent No.: US 11,674,092 B1
(45) Date of Patent: Jun. 13, 2023

(54) USE OF SSZ-41X AND MTW ZEOLITES FOR THE PRODUCTION OF JET AND DIESEL FUELS

(71) Applicant: CHEVRON U.S.A. INC., San Ramon, CA (US)

(72) Inventors: Trenton J. Otto, El Sobrante, CA (US); Ann Jia-Bao Liang, Walnut Creek, CA (US); Stacey Ian Zones, San Francisco, CA (US); Christopher Michael Lew, Alameda, CA (US); Jesús C. Pascual, Berkeley, CA (US); Bi-Zeng Zhan, Albany, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/806,957

(22) Filed: Jun. 15, 2022

Related U.S. Application Data

(60) Provisional application No. 63/314,505, filed on Feb. 28, 2022.

(51) Int. Cl.
*C10G 47/20* (2006.01)
*B01J 29/04* (2006.01)
*B01J 35/10* (2006.01)
*C10L 1/08* (2006.01)
*B01J 29/80* (2006.01)
(Continued)

(52) U.S. Cl.
CPC .............. *C10G 47/20* (2013.01); *B01J 21/04* (2013.01); *B01J 21/12* (2013.01); *B01J 23/28* (2013.01); *B01J 23/30* (2013.01); *B01J 23/755* (2013.01); *B01J 27/16* (2013.01); *B01J 29/048* (2013.01); *B01J 29/80* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1061* (2013.01); *C10L 1/08* (2013.01); *C10G 2300/1014* (2013.01); *C10G 2300/4006* (2013.01); *C10G 2300/4012* (2013.01); *C10G 2300/4018* (2013.01); *C10G 2300/70* (2013.01); *C10G 2400/04* (2013.01); *C10G 2400/08* (2013.01); *C10L 2200/043* (2013.01);
(Continued)

(58) Field of Classification Search
CPC ............ C10G 47/20; C10G 2300/1014; C10G 2300/4006; C10G 2300/4012; C10G 2300/4018; C10G 2300/70; C10G 2400/04; C10G 2400/08; B01J 21/04; B01J 21/12; B01J 23/28; B01J 23/30; B01J 23/755; B01J 27/16; B01J 29/048; B01J 29/80; B01J 35/1019; B01J 35/1023; B01J 35/1038; B01J 35/1042; B01J 35/1047; B01J 35/1061; C10L 1/08; C10L 2200/043; C10L 2200/0446; C10L 2270/026; C10L 2270/04
See application file for complete search history.

(56) References Cited

U.S. PATENT DOCUMENTS 2,985,583 A * 5/1961 Gilmore .................. C10G 59/02
208/104
3,832,449 A * 8/1974 Rosinski ................ C10G 49/08
556/27
(Continued)

*Primary Examiner* — In Suk C Bullock
*Assistant Examiner* — Jason Y Chong

(57) ABSTRACT

A process is disclosed for producing distillate range hydrocarbons using MTW and/or SSZ-41x catalysts.

18 Claims, 6 Drawing Sheets

(51) Int. Cl.
  *B01J 21/04* (2006.01)
  *B01J 21/12* (2006.01)
  *B01J 23/755* (2006.01)
  *B01J 23/28* (2006.01)
  *B01J 23/30* (2006.01)
  *B01J 27/16* (2006.01)

(52) U.S. Cl.
  CPC . *C10L 2200/0446* (2013.01); *C10L 2270/026* (2013.01); *C10L 2270/04* (2013.01)

(56) References Cited

U.S. PATENT DOCUMENTS

| | | | |
|---|---|---|---|
| 3,970,544 A | | 7/1976 | Rosinski et al. |
| 5,591,421 A | | 1/1997 | Zones |
| 5,656,149 A | | 8/1997 | Zones et al. |
| 9,512,372 B2 * | | 12/2016 | Zhan ............... B01J 29/166 |
| 10,167,200 B2 | | 1/2019 | Zones et al. |
| 2015/0136645 A1 * | | 5/2015 | Bhattacharya ......... C10G 65/10 208/57 |
| 2015/0239798 A1 * | | 8/2015 | Scheibel ............... C07C 1/20 585/16 |
| 2022/0288572 A1 * | | 9/2022 | Zones ............... C01B 39/06 |

\* cited by examiner

USE OF SSZ-41X AND MTW ZEOLITES FOR THE PRODUCTION OF JET AND DIESEL FUELS

CROSS-REFERENCE TO RELATED APPLICATIONS

This application claims the priority benefit of U.S. Provisional Application No. 63/314,505, filed Feb. 28, 2022, the disclosure of which is incorporated herein by reference.

FIELD

This invention relates to the use of catalysts containing SSZ-41x and/or MTW for the hydroprocessing, including hydrocracking and hydroisomerization, of hydrocarbon feeds for production of distillate fuels.

BACKGROUND

As the demand for diesel and jet boiling range fuel increases worldwide, there is increasing interest in feedstock sources other than petroleum crude oil.

MTW and SSZ-41 have potential as alternatives to, or replacements for, zeolites, such as USY commonly used in the processing of non-renewable petroleum hydrocarbons for liquid fuel production. However, the application of MTW and SSZ-41 zeolites towards the generation of fuels derived from renewable sources is of particular interest. Paraffinic hydrocarbons, including n-hexadecane (n-C16) and n-octadecane (n-C18), may be readily produced from the hydrodeoxygenation of free fatty acids (e.g., palmitic acid or linoleic acid) present in the form of free acids or triglycerides within renewable vegetable or animal oils. Such paraffins can then be converted, via catalytic hydrocracking (HCR) and/or hydroisomerization (HIS), into hydrocarbon species having a boiling point within the jet range in order to create a route for producing jet fuel from renewable sources.

The difficulty of selectively converting n-C18, which is readily obtainable from a variety of renewable sources, into products having the desired jet boiling range has hampered efforts to develop an economically viable path for generating renewable aviation fuel. The use herein of SSZ-41x and/or MTW zeolites as key components within HCR/HIS catalysts may provide such a path in addition to having use in traditional HCR/HIS applications.

SUMMARY

In one aspect, there is provided a process for producing distillate range hydrocarbons, comprising: contacting under hydroprocessing conditions a hydrocarbon feedstock with a hydroprocessing catalyst to form a hydroprocessed effluent, and fractionating the hydroprocessed effluent to recover one or more hydrocarbon fractions boiling in a range of diesel or jet fuel; wherein the hydroprocessing catalyst comprises a carrier component and a metal component that is supported on the carrier component, wherein carrier component comprises (i) a MTW and/or SSZ-41x zeolite in an amount of from 0.1 wt. % to 75 wt. %, based on total weight of the carrier, (ii) an amorphous silica-alumina in an amount of from 15 wt. % to 85 wt. %, based on total weight of the carrier, and (iii) an alumina binder in an amount of from 5 wt. % to 55 wt. %, based on total weight of the carrier; wherein the metal component comprises a Group 6 metal and a Group 8-10 non-noble metal.

DETAILED DESCRIPTION

Definitions

Figure 1:
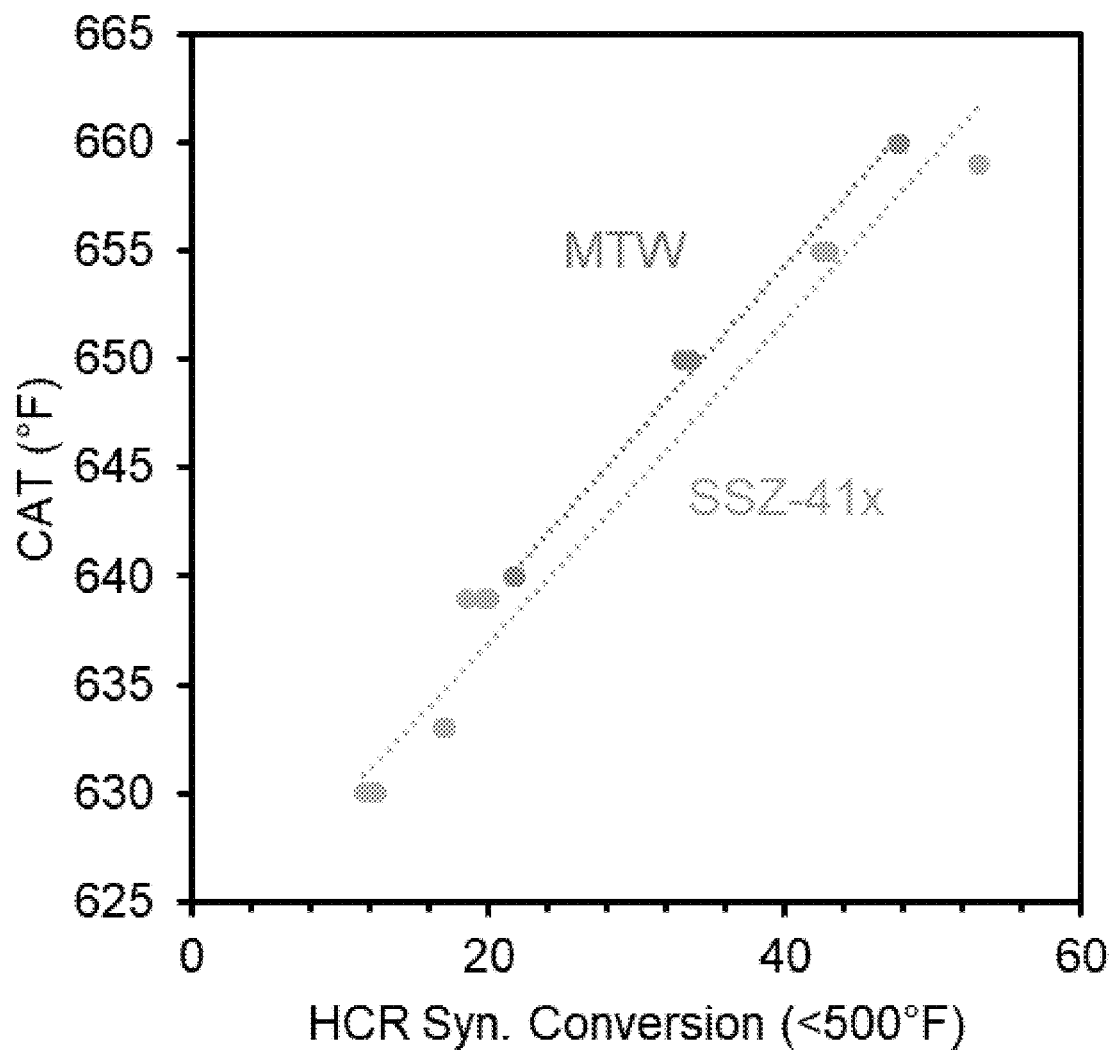
FIG. 1 is a graph of catalyst active temperature (CAT) versus hydrocracking (HCR) conversion (<500° F.) during hydroconversion of n-octadecane with MTW and SSZ-41x catalysts employed in Example 1.

The jet fuel boiling range is defined as 140° C. to 300° C. A jet fuel boiling range fraction is defined as a fraction with an initial boiling point of 140° C. or more, a T10 distillation point of 205° C. or less, and a final boiling point of 300° C. or less. Unless otherwise specified, distillation points and boiling points can be determined according to ASTM D2887.

The diesel boiling range is defined as 140° C. to 375° C. A diesel boiling range fraction is defined as a fraction having a T10 distillation point of 140° C. or more, a final boiling point of 300° C. or more, and a T90 distillation point of 375° C. or less.

The distillate fuel boiling range (jet plus diesel) is defined as about 140° C. to about 427° C.

A "T10" boiling point for a feed represents the temperature at which 10 wt. % of the feed boils off. Similarly, a "T90" boiling point represents the temperature at 90 wt. % of the feed boils. A suitable ASTM method can be used for characterization of boiling points (including fractional boiling points), such as ASTM D86 or ASTM D2887.

The term "hydroprocessing" shall refer to processes which convert hydrocarbons in the presence of hydroprocessing catalyst and hydrogen to more valuable products.

The terms "hydrocracking" ("HCR") and "hydroconversion" shall refer to any process wherein a hydrocarbon feedstream is contacted with a catalyst and hydrogen at an elevated pressure and temperature wherein at least a portion of the hydrocarbon feedstream is converted into lower-boiling point products thereby resulting in an overall lower average boiling point product stream based on weight percent. Hydrocracking is a subset of hydroprocessing processes. Of course, "hydrocracking" or "hydroconversion" may also involve hydroisomerization ("HIS") of long-chain paraffins present in the hydrocarbon streams. Hydroisomerization can improve cold flow properties by increasing the proportion of branched paraffins.

The term "MTW" includes all molecular sieves and their isotypes that have been assigned the framework type MTW by the Structure Commission of the International Zeolite Association. MTW framework type molecular sieves have a unique pore system consisting of one-dimensional channels containing 12-membered T-atom rings. Molecular sieves having the MTW framework type include CZH-5, NU-13, Theta-3, TPZ-12, and ZSM-12.

The term "SSZ-41x" refers to a zincoaluminosilicate molecular sieve having the framework structure of SSZ-41 and characterized as having (a) a $SiO_2/Al_2O_3$ molar ratio of 30 to less than 100, such as 50 to 90 or 60 to 80; (b) a $SiO_2/ZnO$ molar ratio of 15 to 75, such as 20 to 40; and (c) a mean crystal size of less than 500 nm, such as 50 to 500 nm, or 50 to 250 nm, or 75 to 500 nm, or 75 to 250 nm. As conventionally synthesized per the teachings of U.S. Pat. No. 5,591,421, SSZ-41 has a mean crystal size of at least 1000 nm. SSZ-41 has a structure similar to VPI-8 (VET framework type), a material having a unique one-dimensional channel containing 12-membered T-atom rings but differs from VPI-8 in that SSZ-41 has an argon capacity greater than (e.g., up to about three times) that reported for VPI-8 and SSZ-41 may contain aluminum in its framework structure whereas VPI-8 does not contain framework aluminum.

The term "zincoaluminosilicate" refers to a synthetic molecular sieve having a framework structure constructed of zinc, alumina and silica (i.e., repeating ZnO4, AlO4 and SiO4 tetrahedral units).

The term "unconverted oil" and its acronym "UCO" refers to a highly paraffinic fraction from a hydrocracker with a low nitrogen, sulfur and Ni content and including hydrocarbons having an initial boiling point corresponding to the end point of the atmospheric gas oil (AGO) range hydrocarbons, in certain embodiments the initial boiling point in the range of 340° C. to 370° C. (e.g., 340° C., or 360° C., or 370° C.) and an end point in the range of about 510° C. to 560° C. (e.g., 540° C., or 550° C. or 560° C.). UCO is also known in the industry by other synonyms including "hydrowax".

The term "Cn hydrocarbons" or "Cn", wherein "n" is an integer value, and means hydrocarbons having that value of carbon atoms. The term "Cn+ hydrocarbons" or "Cn+" refers to hydrocarbons having that value or more carbon atoms. The term "Cn− hydrocarbons" or "Cn−" refers to hydrocarbons having that value or less carbon atoms.

The terms "wt. %," "vol. %," or "mol. %" refers to a weight, volume, or molar percentage of a component, respectively, based on the total weight, the total volume of material, or total moles, that includes the component. In a non-limiting example, 100 grams of material containing 10 grams of a specific component is 10 wt. % of that component.

The term "$SiO_2/Al_2O_3$ molar ratio" may be abbreviated as "SAR".

Hydrocarbon Feedstock

A wide range of petroleum and chemical feedstocks can be hydroprocessed in accordance with the present disclosure. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

In some aspects, at least a portion of the feed can correspond to a feed derived from a biocomponent source. In this discussion, a biocomponent feedstock refers to a hydrocarbon feedstock derived from a biological raw material component, from biocomponent sources such as vegetable, animal, fish, and/or algae. The biocomponent feedstock may be obtained, for example, by hydrodeoxygenation and optional isomerization of renewable oils.

The feed can include at least about 10 wt. % of feed based on a biocomponent source or sources (e.g., at least 25 wt. %, or at least 40 wt. %, or at least 50 wt. %, or at least 75 wt. %, or at least 90 wt. %, or at least about 95 wt %). Additionally or alternately, the feed can be entirely a feed from a biocomponent source, or the feed can include about 99 wt. % or less of a feed based on a biocomponent source (e.g., 90 wt. % or less, or 75 wt. % or less, or 50 wt. % or less).

One way of defining a feedstock is based on the boiling range of the feed. Typical feeds include, for example, feeds with an initial boiling point and/or a T5 boiling point of at least about 400° F. (204° C.), such as at least about 450° F. (232° C.). Additionally or alternatively, the final boiling point, T95 boiling point and/or T90 boiling point of the feed can be about 850° F. (454° C.) or less, such as 800° F. (427° C.) or less or about 750° F. (399° C.) or less. It is noted that feeds with lower T5 boiling points may also be suitable. However, the resulting yields of such lower boiling feeds can be characterized relative to the 400° F.+(204° C.+) portion of the feed.

In some aspects, the feedstock can have an elevated n-paraffin content. The n-paraffin content of the feedstock can be at least 40 wt. % (e.g., at least 50 wt. %, or at least 75 wt. %, or at least 90 wt. %, or at least 95 wt. %).

Hydroprocessing

Hydroprocessing can be performed by exposing a feedstock to a hydroprocessing catalyst under effective hydroprocessing conditions.

Hydroprocessing can be performed in one or more fixed-bed, ebullated-bed, slurry-bed, moving bed, continuous stirred tank (CSTR), or tubular reactors, in series and/or parallel arrangement. A fixed-bed reactor may comprise multiple vessels, single or multiple beds of catalyst in each vessel, and various combinations of hydroprocessing catalyst in one or more vessels.

The reaction conditions during hydroprocessing can be selected to generate a desired level of conversion of a feed. Conversion of the feed can be defined in terms of conversion of molecules that boil above a temperature threshold to molecules below that threshold. The conversion temperature can be any convenient temperature, such as 260° C. (500° F.) or 371° C. (700° F.). For example, process conditions can be selected to achieve at least 10% conversion of the 260° C.+ portion of a feedstock. In other words, the conditions are selected so that at least about 10 wt. % of the portion of the feed that boils above 260° C. is converted to a portion that boils below 260° C. In some aspects, the amount of single pass conversion relative to 260° C. can be at least 20% (e.g., at least 30%, or at least 40%, or at least 50%). Additionally or alternately, the conversion percentage can be about 80% or less (e.g., 70% or less, or 60% or less). An example of a suitable amount of conversion can be a conversion percentage of from 30% to 80% (e.g., 40% to 70%).

Process conditions can include a reaction temperature in a range of from 300° C. to 500° C. (e.g., 300° C. to 450° C., or 330° C. to 450° C.); a total pressure in a range of from 6 MPa to 30 MPa (e.g., 10 MPa to 20 MPa, or 12 MPa to 18 MPa); a hydrogen feed rate (standard liter per liter of hydrocarbon feed)in a range of from 800 SL/L to 2000 SL/L (e.g., 1000 SL/L to 2000 SL/L, or 1000 SL/L to 1500 SL/L); and a liquid hourly space velocity (LHSV) in a range of from 0.1 $h^{-1}$ to 10 $h^{-1}$ (e.g., 0.5 $h^{-1}$ to 5 $h^{-1}$, or 0.5 $h^{-1}$ to 2 $h^{-1}$).

The hydroprocessing is carried out in the presence of hydrogen. A hydrogen stream is, therefore, fed or injected into a reactor or reaction zone or hydroprocessing zone in which the hydroprocessing catalyst is located. Hydrogen, which is contained in a hydrogen "treat gas", can be either pure hydrogen or a hydrogen-containing gas, which is a gas stream containing hydrogen in an amount that is sufficient for the intended reaction(s), optionally including one or more other gases (e.g., nitrogen and light hydrocarbons such as methane). The treat gas stream introduced into a reaction stage can contain at least 50 vol. % (e.g., at least 75 vol. %) hydrogen. Optionally, the hydrogen treat gas can be substantially free (less than 1 vol. %) of impurities such as $H_2S$ and $NH_3$ and/or such impurities can be substantially removed from a treat gas prior to use. Hydrogen can be supplied co-currently with the input feed to the hydroprocessing reactor and/or reaction zone or separately via a separate gas conduit.

Following hydroprocessing, the hydroprocessed effluent can then be passed through a gas-liquid separator to remove a gas phase portion from the effluent. The liquid phase output from the separator can then be fractionated to form at least a converted fraction comprising distillate range products and an unconverted fraction comprising higher boiling range products typically resulting from an unconverted portion. For example, the fractionator can be used to produce at least a diesel fraction and a jet hydrocarbon fraction. The unconverted portion can then be hydrocracked, with optional recycle of any remaining unconverted portion for further hydrocracking. Optionally, a common fractionator or other separator can be used for separating distillate fuel boiling range products from unconverted portions of the feed that have a boiling range above the distillate fuel boiling range. Fractionation can be performed, for example, using a distillation unit, such as an atmospheric distillation unit.

Optionally, the hydroprocessed products can be dewaxed to provide distillate fuel boiling range products having improved cold flow properties.

Diesel and jet range hydrocarbon fractions obtained herein may be used as a drop-in fuel composition or blended with an existing fuel composition.

Hydroprocessing Catalyst

Catalysts used in carrying out the present hydroprocessing process include a carrier component and a metal component that is supported on the carrier component, The carrier component comprises (i) a MTW and/or SSZ-41x zeolite in an amount of from 0.1 wt. % to 75 wt. %, based on total weight of the carrier (ii) an amorphous silica-alumina in an amount of from 15 wt. % to 85 wt. %, based on total weight of the carrier, and (iii) an alumina binder in an amount of from 5 wt. % to 55 wt. %, based on total weight of the carrier. The metal component comprises a Group 6 metal and a Group 8-10 non-noble metal.

In some aspects, the MTW zeolite is ZSM-12.

Preferably, the zeolite has a low $SiO_2/Al_2O_3$ molar ratio. For example, the $SiO_2/Al_2O_3$ molar ratio of the MTW zeolite can be in the range of from 25 to 100 (e.g., 25 to 75, or 25 to 50, or 30 to 100, or 30 to 75, or 30 to 50). SSZ-41x can have a $SiO_2/Al_2O_3$ molar ratio ranging from 30 to less than 100 (e.g., 50 to 90) and a $SiO_2/ZnO$ molar ratio ranging from 15 to 75 (e.g., 20 to 40). Means and methods for quantifying the $SiO_2/Al_2O_3$ and $SiO_2/ZnO$ molar ratios of a zeolite are well known in the art and include Atomic Absorption Spectroscopy (AAS), Inductively Coupled Plasma—Atomic Emission Spectroscopy (ICP-AES), and X-ray fluorescence (XRF).

Preferably, the zeolite is in a hydrogen form or a $NH_4^+$ form (i.e., having at least a portion of the original cations associated therewith replaced by $H^+$ ions or $NH_4^+$ ions, respectively). A first method involves direct treatment employing an acid, for example a mineral acid ($HNO_3$, HCl, etc.). A second method involves direct exchange using an ammonium salt (e.g., $NH_4NO_3$) followed by calcination. The zeolite can optionally contain up to trace levels of other cations such as $Na^+$ (wherein a trace level is at most 0.05 wt. % based upon the total weight of the zeolite).

The amount of zeolite in the carrier can range from 0.1 wt. % to 75 wt. % (e.g., 0.5 wt. % to 25 wt. %), based on the total weight of the carrier.

The amorphous silica-alumina (ASA) may comprise a porous amorphous silica-alumina such as a SIRAL high pore volume ASA, but high pore volume is not needed for the catalyst to be effective. The ASA may comprise from 20 wt. % to 50 wt. % silica with the balance being alumina.

The ASA powder prior to incorporation into the catalyst may have total pore volume of from 0.5 $cm^3/g$ to 2.0 $cm^3/g$ (e.g., 0.6 $cm^3/g$ to 1.6 $cm^3/g$), as determined by $N_2$ adsorption at 77 K. The average pore diameter of the ASA powder prior to incorporation into the carrier may be in a range of from 4 nm to 14 nm (e.g., 5 to 13 nm), as determined by the BJH Method. The total BET surface area of the ASA powder prior to incorporation may be in a range of from 400 $m^2/g$ to 550 $m^2/g$ (e.g., 410 $m^2/g$ to 510 $m^2/g$).

The amount of ASA in the carrier can range from 15 wt. % to 85 wt. % (e.g., 50 wt. % to 80 wt. %), based on the total weight of the carrier.

Any alpha-, eta-, theta- or gamma-alumina would be a suitable alumina binder for the support, with gamma being preferred. The amount of alumina in the carrier can range from 5 wt. % to 55 wt. % (e.g., 15 wt. % to 35 wt. %), based on the total weight of the carrier.

The carrier may include a refractory binder or matrix other than alumina that is optionally utilized to facilitate fabrication and provide strength. Suitable binders can include inorganic oxides, such as at least one of silica, magnesia, zirconia, chromia, titania, boria, thoria, and zinc oxide.

The carrier to be used may be in the form of shaped particles. A shaped carrier may be prepared by any suitable method known to those skilled in the art. The particles may be of various shapes such as cylinders, polylobes, etc. and nominal sizes such as 1/16 inch, 1/8 inch, 3/16 inch, etc.

After forming support particles, the support particles can be impregnated with metal salts using an impregnation solution. Impregnation, such as impregnation by incipient wetness or ion exchange in solution, is a commonly used technique for introducing metals into a catalyst that includes a support. Suitable metal salts can include typical salts used for aqueous impregnation of support particles for catalysts.

The hydroprocessing includes at least one Group 6 metal and at least one Group 8-10 non-noble metal as hydrogenation or catalytic metals.

The Group 6 metal may include chromium, molybdenum, tungsten, or any combination thereof, preferably molybdenum and/or tungsten. The Group 6 metal, in oxide form, can typically be present in an amount ranging from 2 wt. % to 70 wt. % (e.g., 5 wt. % to 40 wt. %, or 10 wt. % to 30 wt. %), based on the total weight of the catalyst.

The Group 8-10 non-noble metal may include iron, cobalt, nickel, or any combination thereof, preferably nickel. The Group 8-10 non-noble metal, in oxide form, can typically be present in an amount ranging from 1 wt. % to 40 wt. % (2 wt. % to 15 wt. %), based on the total weight of the catalyst.

In some aspects, the total metal content (Group 6 plus Group 8-10 metals), in oxide form, can be in a range of 15 wt. % to 55 wt. % (e.g., 20 wt. % to 40 wt. %), based on the total weight of the catalyst. The amount of the metals in the catalyst can be determined, for example, by subjecting the catalyst to XRF or ICP analysis.

The hydroprocessing catalyst can further comprise an organic dispersion agent. The organic dispersion agent can be an organic compound comprising 2 to 10 carbons and having a ratio of carbon atoms to oxygen atoms of from 0.6 to 2. The organic dispersion agent may also be a chelating agent. Examples of suitable organic dispersion agents include glycols (e.g., ethylene glycol) and organic acids (e.g., citric acid, gluconic acid). Optionally, the organic dispersion agent can be a nitrogen-containing organic compound, such as nitrilotriacetic acid. Without being bound by any particular theory, it is believed that the organic dispersion agent can be removed from the catalyst precursor/catalyst during heating, calcination, and/or sulfidation steps that are performed after impregnation to form metal oxides and/or metal sulfides. It is believed that the dispersion agent can assist with modifying the distribution of metals across the catalyst support.

When metals are added to a catalyst by impregnation, the amount of organic dispersion agent in the impregnation solution can be selected based on the amount of metal in the solution. In some aspects, the molar ratio of organic additive to total metals in the solution can be from 0.1 to 5.0 (e.g., 0.1 to 2.0, or 0.1 to 1.0, or 0.2 to 5.0, or 0.2 to 2.0, or 0.2 to 1.0, or 0.3 to 5.0, or 0.3 to 2.0, or 0.3 to 1.0, or 0.4 to 5.0, or 0.4 to 2.0, or 0.4 to 1.0). Additionally or alternately, the molar ratio of organic additive to Group 8-10 metal (e.g., Ni) can be from 0.5 to 10 (e.g., 0.5 to 5.0, or 0.5 to 3.0, or 1.0 to 10, or 1.0 to 5.0, or 1.0 to 3.0).

If desired, further materials can be added, in addition to the metal components already added, such as any material that would be added during conventional hydroprocessing catalyst preparation. Suitable examples of such further materials can include phosphorus compounds, boron compounds, fluorine-containing compounds, additional transition metals, rare earth metals, fillers, or any combination thereof.

In some aspects, the catalyst further comprises a phosphorus compound. Suitable phosphorus compounds may include ammonium phosphate, phosphoric acid, or organic phosphorus compounds. Phosphorus compounds can be added at any stage of the catalyst preparation process. The amount of phosphorus in the catalyst may be at least 1 wt. % (calculated as $P_2O_5$), based on the total weight of the catalyst and more preferably in a range of from 1 to 10 wt. % (calculated as $P_2O_5$), based on the total weight of the catalyst.

After shaping of the carrier, and also after metals impregnation, the carrier/catalyst composition is suitably dried, and calcined. Drying temperatures can range from 50° C. to 200° C.; drying times are suitably from 0.5 to 5 hours. Calcination temperatures can range from 200° C. to 800° C., (e.g., 300° C. to 600° C.). For calcination of the carrier, a relatively short time period is required, for example 0.5 to 3 hours. For calcination of the catalyst composition, it may be necessary to employ controlled temperature ramping at a low rate of heating to ensure the optimum dispersion of the metals: such calcination may require from 5 to 20 hours.

Prior to contacting with the hydrocarbon feedstock, the catalyst may be sulfided prior to use to form a sulfided metal catalyst. The sulfidation of the metals can be performed by any convenient method, such as gas-phase sulfidation or liquid-phase sulfidation. Sulfidation is generally carried out by contacting a catalyst precursor (such as a catalyst precursor that includes metals complexed by a dispersion agent and/or metals in the form of metal oxides) with a sulfur-containing compound, such as elemental sulfur, hydrogen sulfide or polysulfides. Hydrogen sulfide is a convenient sulfidation agent for gas-phase sulfidation and can be incorporated into a gas-phase sulfidation atmosphere containing hydrogen in an amount of from 0.1 wt. % to 10 wt. %. Sulfidation can also be carried out in the liquid-phase utilizing a combination of a polysulfide, such as a dimethyl disulfide spiked hydrocarbon stream, and hydrogen. The sulfidation can be performed at a convenient sulfidation temperature, such as a temperature from 150° C. to 500° C. The sulfidation can be performed at a convenient sulfidation pressure, such as a pressure of 100 psig to 1000 psig (689.5 kPa to 6.895 MPa) or more. The sulfidation time can vary depending on the sulfidation conditions, so that sulfidation times of 1 hour to 72 hours can be suitable. The resulting catalyst may also be steamed prior to use.

EXAMPLES

The following illustrative examples are intended to be non-limiting.

Example 1

Production of Jet Boiling Range Hydrocarbons from n-Octadecane

An SSZ-41x catalyst was screened alongside an MTW catalyst for hydroconversion of n-octadecane to jet boiling range hydrocarbons. Catalysts were prepared by conventional means. A blended and extruded base material containing zeolite, alumina binder, and amorphous silica-alumina (ASA) was co-impregnated by an aqueous solution containing $NiCO_3$, citric acid, $MoO_3$, $(NH_4)_6H_2W_{12}O_{40}$, and $H_3PO_4$, and subsequently calcined in air at 450° C. for 60 minutes. SSZ-41x had a $SiO_2/Al_2O_3$ molar ratio of 75. The MTW zeolite (Zeolyst International) had a $SiO_2/Al_2O_3$ molar ratio of 80-90. The properties of the catalysts are summarized in Table 1.

TABLE 1

| | Catalyst Properties | | | |
|---|---|---|---|---|
| | Catalyst 1 | | Catalyst 2 | |
| | Carrier Composition | | | |
| Base Zeolite | Component | Weight % [a] | Component | Weight % [a] |
| | SSZ-41x | 15 | MTW | 15.6 |

TABLE 1-continued

Catalyst Properties

|  | Catalyst 1 | | Catalyst 2 | |
|---|---|---|---|---|
| ASA | PIDC S5 | 60 | PIDC S5 | 59.4 |
| Alumina | CATAPAL B | 25 | CCG | 25 |
| Metal Loading | | | | |
| Metal | Weight % [b] | | Weight % [b] | |
| NiO | 2.90 | | 4.57 | |
| MoO$_3$ | 19.30 | | 30.43 | |
| WO$_3$ | — | | — | |
| P$_2$O$_5$ | 2.50 | | 3.93 | |
| Chelate [c] | Yes | | Yes | |

[a] Carrier composition on a metal-free basis.
[b] Nominal loadings in the finished (co-impregnated and calcined) assuming full uptake of impregnating solution component.
[c] Chelating agent is citric acid present in the impregnating solution at a Ni/citric acid mass ratio of 0.36 g/g.

Catalyst performance was evaluated in a bench-scale unit operated in single-stage once-through mode at conditions shown in Table 2.

TABLE 2

Conditions for n-Octadecane Hydroprocessing

| Test Parameter | Test Value |
|---|---|
| Total Inlet Pressure [psig] | 1660 |
| H$_2$ Pressure [psia] | 1542 |
| LHSV [h$^{-1}$] | 1.6 |
| H$_2$ Treat Gas Rate [SCF/BBL] | 5000 |
| Test Parameter | Test Value |
| Target Conversion | 20-50% <500° F. |
| Pretreatment | Sulfidation [a] |
| Feed | n-Octadecane |
| Catalyst Charge | 6 cm$^3$ [b] |

[a] Catalysts were treated by straight-run diesel containing 1 wt. % S (dimethyl disulfide) and 33 ppm N (tributylamine) at 2000 psig, 5000 SCF H$_2$/BBL, and 2.0 h$^{-1}$ LHSV, for 8 h at 650° F.
[b] 0.0625-inch asymmetric quadrilobed extrudate.

FIG. 1 is a graph of catalyst active temperature (CAT) versus hydrocracking (HCR) conversion (<500° F.) during hydroconversion of n-octadecane with SSZ-41x and MTW catalysts. As shown, over the range of synthetic HCR conversions examined (about 20-50% for <500° F.), the catalysts containing MTW and SSZ-41 differed in activity by no more than about 5° F. and, on average, by about 2° F., rendering them effectively equivalent in activity at the precision of the testing method. The results are summarized in Table 3.

TABLE 3

Catalyst Active Temperatures for MTW and SSZ-41x Catalysts

| | Catalyst Active Temperature [° F.] | |
|---|---|---|
| HCR Conversion [%] | MTW Catalyst | SSZ-41x Catalyst |
| 20 | 639 | 638 |
| 35 | 651 | 649 |
| 50 | 663 | 661 |

Figure 2:
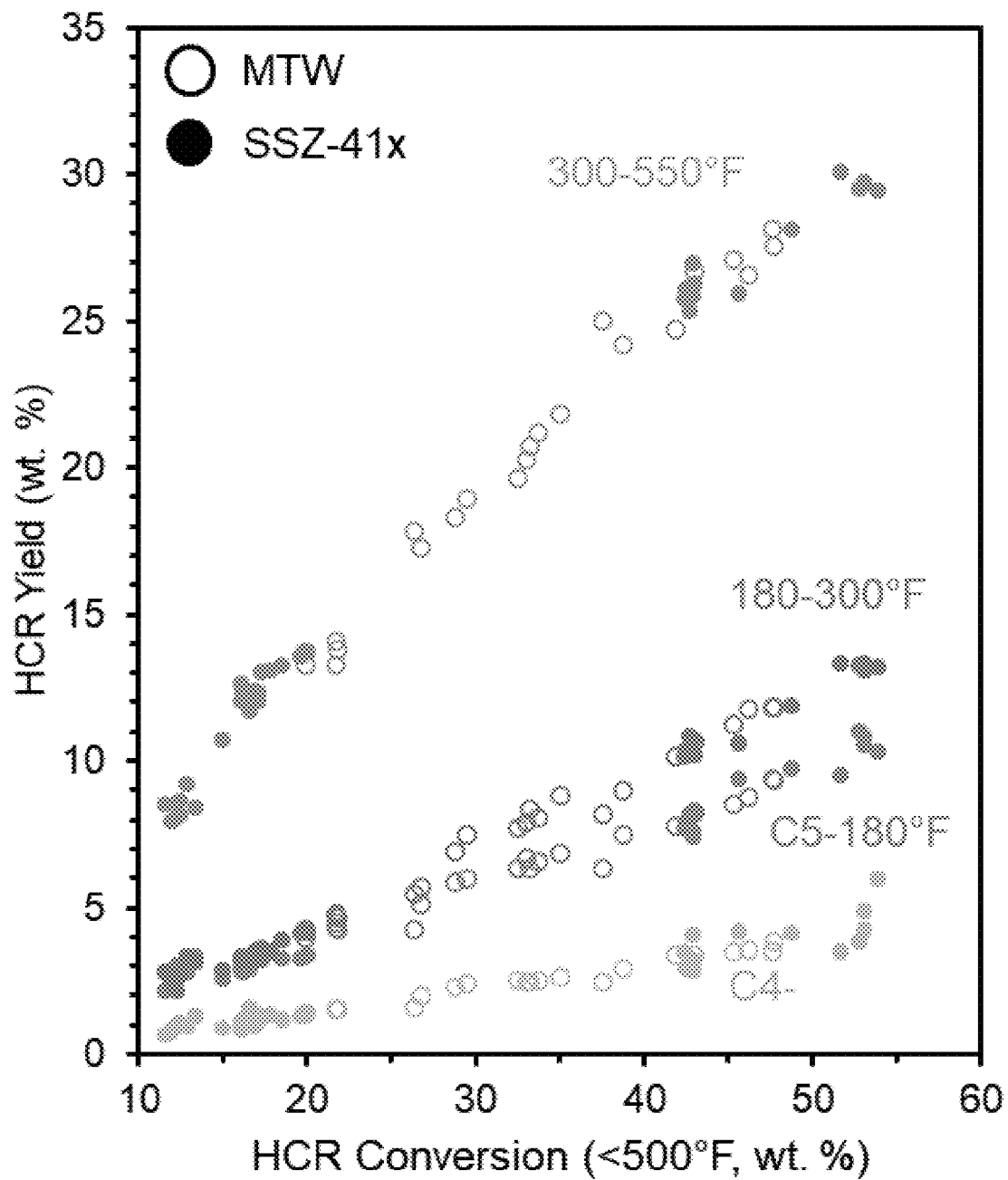
FIG. 2 is a graph of product fraction yields as a function of HCR conversion (<500° F.) during hydroconversion of n-octadecane with MTW and SSZ-41x catalysts employed in Example 1.

FIG. 2 is a graph of product fraction yields as a function of HCR conversion during hydroconversion of n-octadecane with SSZ-41x and MTW catalysts. As shown, the MTW and SSZ-41 catalysts gave nearly equivalent product yields of jet (300° F.-550° F.), heavy naphtha (180° F.-300° F.), light naphtha (C5-180° F.), and gas (C4−) over the range of conversions examined. The jet and gas yields are of particular interest because they are the primary desired and undesired products respectively. These results are summarized in Table 4.

TABLE 4

Jet and C4- Yields for n-Octadecane Hydroconversion with MTW and SSZ-41x Catalysts

| | Jet Yield [%] | | C4- Yield [%] | |
|---|---|---|---|---|
| HCR Conversion | MTW Catalyst | SSZ-41x Catalyst | MTW Catalyst | SSZ-41x Catalyst |
| 20 | 12.5 | 14.2 | 1.4 | 1.4 |
| 35 | 22.0 | 24.3 | 2.6 | 2.5 |
| 50 | 28.6 | 28.7 | 3.7 | 4.2 |

In addition, the cracking of n-octadecane (normal boiling point or nBP=603° F.) to form normal C8 hydrocarbons (nBP=257° F.) or lower generates product compounds falling below the jet boiling range (300° F.-550° F.) Without being bound by any theory, it is believed that the high yields of the jet product fraction (see, e.g., FIG. 2) observed relative to lower-boiling product fractions such as heavy naphtha indicates that the conversion of n-octadecane by the MTW and SSZ-41x catalysts occurs primarily, or in large part, through its isomerization into species that boil within the jet range. This is a desirable outcome that avoids over-cracking into less desirable light fractions and demonstrates the viability of using MTW and/or SSZ-41x for selectively producing jet fuel from normal octadecane.

Figure 3:
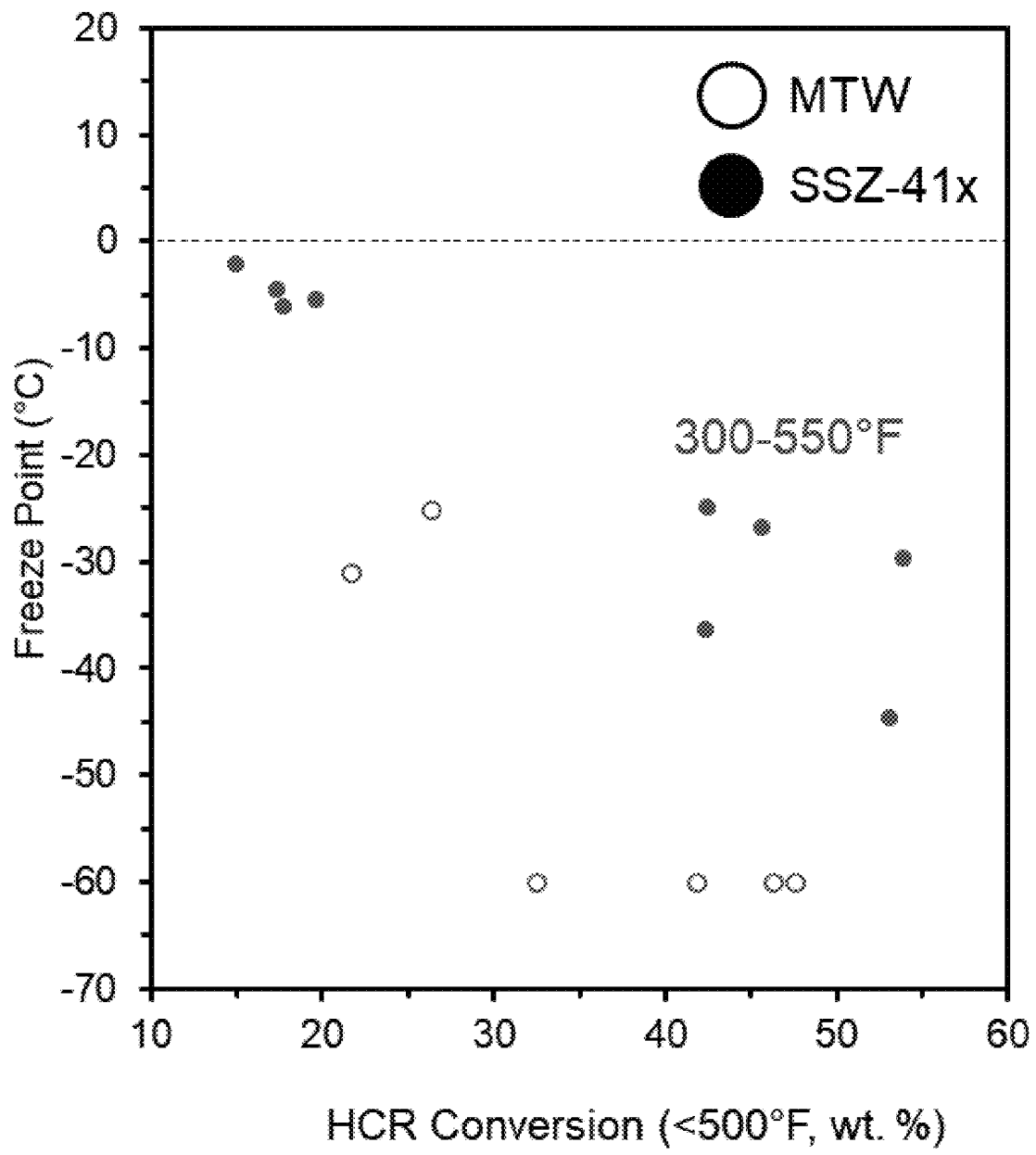
FIG. 3 is a graph of freeze point of jet product fractions as a function of HCR conversion (<500° F.) during hydroconversion of n-octadecane with MTW and SSZ-41x catalysts employed in Example 1.

FIG. 3 is a graph of freeze point of jet product fractions as a function of HCR conversion during hydroconversion of n-octadecane with MTW and SSZ-41x catalysts. The lowest detectable freeze point with the analytical method used was −60° C. As shown in FIG. 3, the freeze point of the jet fraction (300° F.-550° F.) generated by the catalysts tended to decrease with increasing HCR conversion. At similar conversion, the sample containing MTW generated a jet fraction freezing at a lower temperature than that produced by the catalyst having SSZ-41x, with the MTW and SSZ-41x catalysts giving jet freeze points of −31.1° C. and −5.4° C. at 19.6 wt. % and 21.7 wt. % HCR conversion, respectively.

Figure 4A:
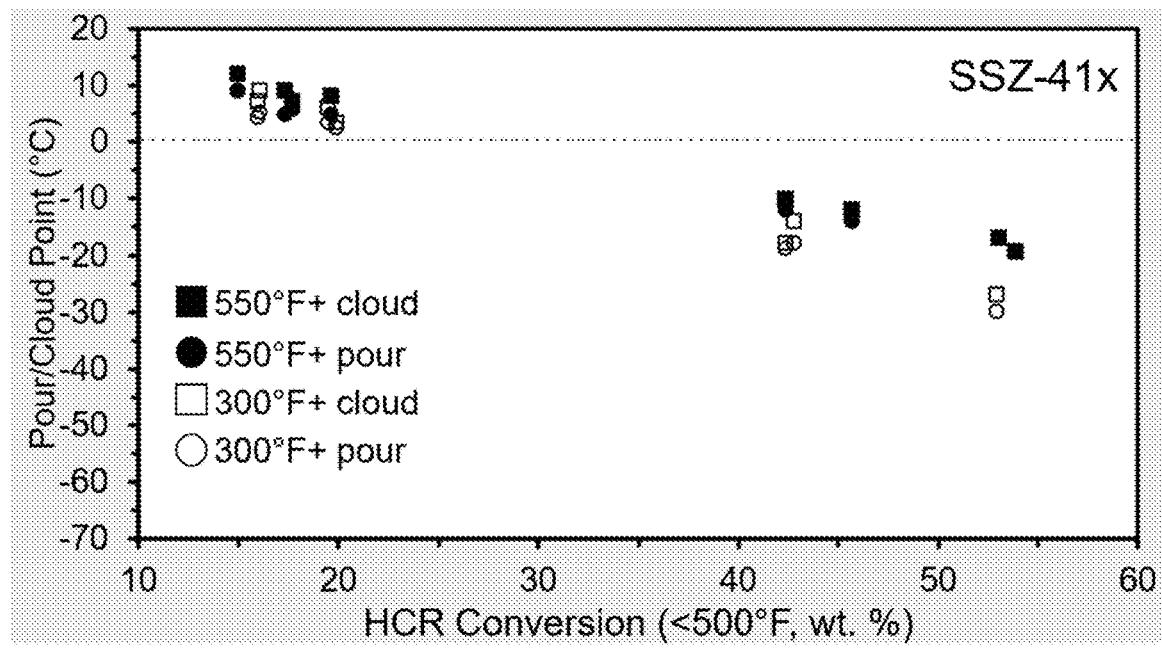
FIG. 4A is a graph of jet product cloud points and pour points as a function of HCR conversion (<500° F.) during hydroconversion of n-octadecane with the SSZ-41x catalyst employed in Example 1.
Figure 4B:
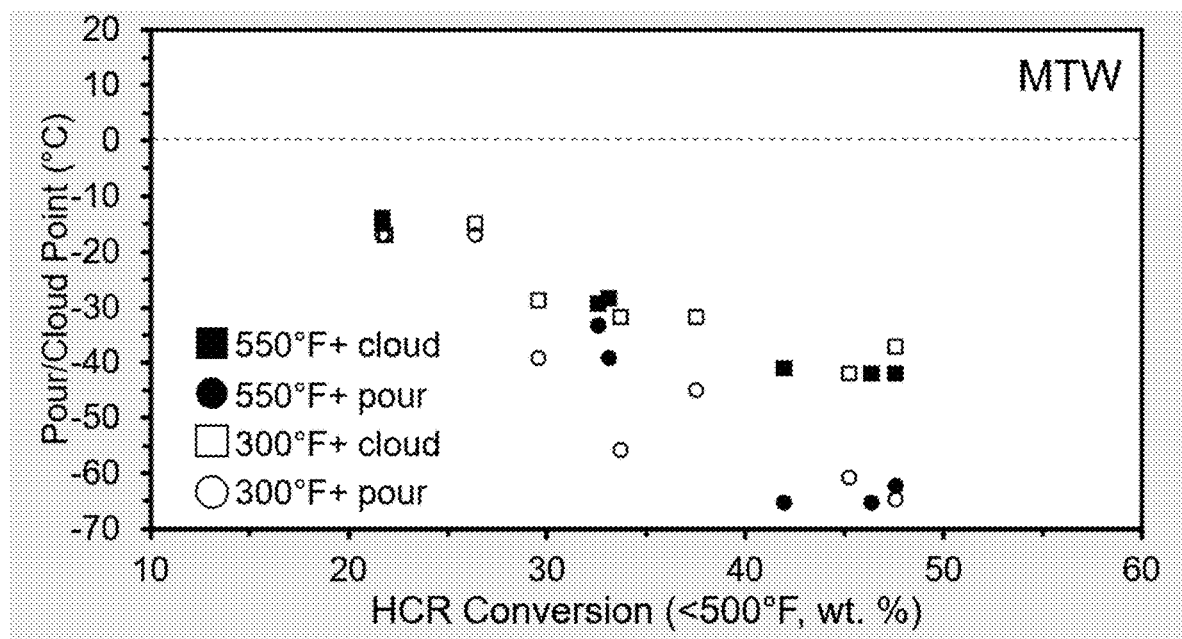
FIG. 4B is a graph of jet product cloud points and pour points as a function of HCR conversion (<500° F.) during hydroconversion of n-octadecane with the MTW catalyst employed in Example 1.

FIGS. 4A-4B are graphs of jet product cloud points and pour points as a function of HCR conversion during hydroconversion of n-octadecane with SSZ-41x and MTW catalysts, respectively. As shown in FIGS. 4A-4B, the pour/cloud points of the products boiling at 300° F.+ and 500° F.+ were generally lower for the catalyst containing MTW rather than SSZ-41x.

In summary, catalysts containing MTW and SSZ-41x in general gave similar n-C18 HCR performance with respect to activity and product selectivity, although the catalyst containing SSZ-41x was prepared with significantly lower metal content than that with MTW. As a result, SSZ-41x may overall hold an advantage over MTW for the purpose of generating jet fuel from renewable sources given its ability to produce similar HCR yields with less metal overall and, by proxy, less hydrogenation activity. However, the freeze point of the jet fuel produced by SSZ-41x is higher than that derived from MTW, which is generally less desirable. Catalysts containing either MTW or SSZ-41x zeolites show viability for the production of jet fuel from renewable sources via their ability to convert n-C18 into products within the 300° F.-550° F. boiling range at a sufficiently high yield and with satisfactory activity.

Example 2

Production of Middle Distillates from Conventional Petroleum Feedstock

An SSZ-41x catalyst was screened alongside an MTW catalyst for hydroconversion of an unconverted oil (UCO) to middle distillate boiling range hydrocarbons. SSZ-41x and MTW catalysts were prepared as described in Example 1 except that the MTW zeolite (SAR=80) was prepared in-house. The properties of the catalysts are summarized in Table 2.

TABLE 2

Catalyst Properties

| Base | Catalyst 3 | | Catalyst 4 | |
|---|---|---|---|---|
| | Component | Weight % [a] | Component | Weight % [a] |
| Carrier Composition | | | | |
| Zeolite | SSZ-41x | 2 | MTW | 0.7 |
| ASA | SIRAL 40 | 73 | SIRAL 40 | 74.3 |
| Alumina | CATAPAL B | 25 | CATAPAL B | 25 |
| Metal Loading | | | | |
| Metal | Weight % [b] | | Weight % [b] | |
| NiO | 3.7 | | 6.0 | |
| MoO$_3$ | — | | — | |
| WO$_3$ | 28.0 | | 22.0 | |
| P$_2$O$_5$ | — | | — | |
| Chelate [c] | Yes | | Yes | |

[a] Carrier composition on a metal-free basis.
[b] Nominal loadings in the finished (co-impregnated and calcined) assuming full uptake of impregnating solution component.
[c] Chelating agent was citric acid present in the impregnating solution at a Ni/citric acid mass ratio of 0.4 g/g.

The petroleum feedstock was an unconverted oil (UCO) having the properties set forth in Table 6.

TABLE 6

UCO Feedstock Properties

| Property | Test Method | Result |
|---|---|---|
| Density [g/mL] | ASTM D4052 | 0.831 |
| API Gravity | ASTM D4052 | 31.0 |
| Sulfur [ppm] | ASTM D4629 | 20.3 |
| Nitrogen [ppm] | ASTM D4294 | 0.9 |
| Wax Content (−15° C. dewax) [wt. %] | — | 14.3 |
| Kinematic Viscosity at 70° C. [mm$^2$/s] | ASTM D445 | 11.9 |
| Kinematic Viscosity at 100° C. [mm$^2$/s] | ASTM D445 | 5.8 |
| Viscosity Index | ASTM D2270 | 118 |
| Paraffins [vol. %] | ASTM D6729 | 20.2 |
| Naphthenes [vol. %] | ASTM D6729 | 56.6 |
| Aromatics [vol. %] | ASTM D6729 | 20.9 |
| Large-Ring Polycyclic Aromatic Hydrocarbons [ppm] | ASTM D6379 | 81.7 |

Catalyst performance was evaluated in a bench-scale unit operated in single-stage once-through mode at conditions shown in Table 7.

TABLE 7

Conditions for UCO Hydroprocessing

| Test Parameter | Test Value |
|---|---|
| Total Pressure [psig] | 2000 |
| LHSV [h$^{-1}$] | 1.5 |
| H$_2$ Treat Gas Rate [SCF/BBL] | 5000 |
| Target Conversion | 60% <700° F. |
| Pretreatment | Sulfidation [a] |

[a] Catalysts were treated by straight-run diesel containing 1 wt. % S (dimethyl disulfide) and 33 ppm N (tributylamine) at 2000 psig, 5000 SCF H$_2$/BBL, and 2.0 h$^{-1}$ LHSV, for 8 h at 650° F.

Figure 5:
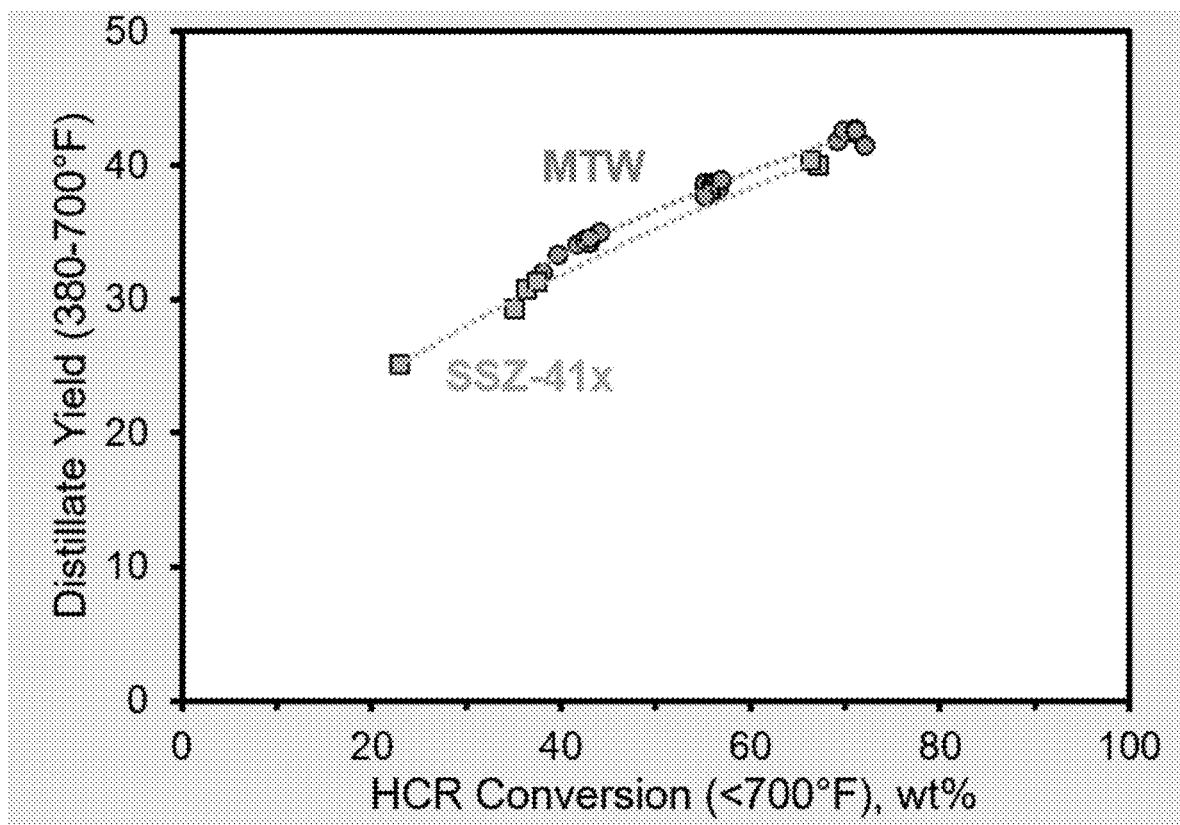
FIG. 5 is a graph of distillate yield as a function of HCR conversion (<700° F.) during hydroconversion of unconverted oil with MTW and SSZ-41x catalysts employed in Example 2.

FIG. 5 is a graph of distillate yield as a function of HCR conversion during hydroconversion of UCO with MTW and SSZ-41x catalysts. As shown in FIG. 5, catalysts containing MTW and SSZ-41x generated similar distillate (380° F.-700° F.) yields over the range of conversions examined, with the MTW catalyst producing about 1 wt. % higher yields at any given conversion. These results are summarized in Table 8.

TABLE 8

Distillate Yields for UCO Hydroconversion with MTW and SSZ-x Catalysts

| | Distillate Yield [%] | |
|---|---|---|
| HCR Conversion [%] | MTW Catalyst | SSZ-41x Catalyst |
| 50 | 36.6 | 35.2 |
| 60 | 39.5 | 38.2 |
| 70 | 42.0 | 40.9 |

Figure 6:
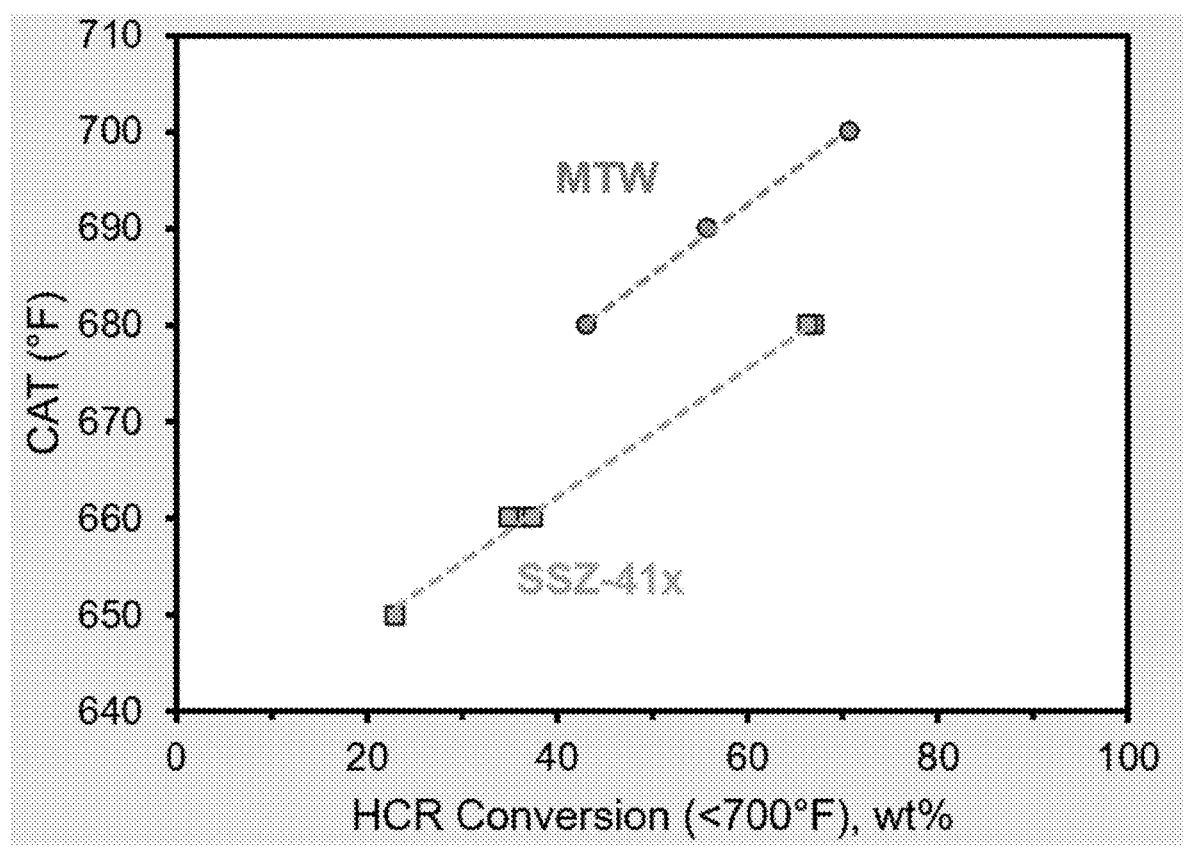
FIG. 6 is a graph of CAT versus HCR conversion (<700° F.) during hydroconversion of unconverted oil with MTW and SSZ-41x catalysts employed in Example 2.

FIG. 6 is a graph of CAT versus HCR conversion (<700° F.) during hydroconversion of UCO with the MTW and SSZ-41x catalysts employed. As shown in FIG. 6, the SSZ-41x catalyst exhibited a significant advantage in activity, by about 18° F., over the MTW catalyst within the range of HCR conversions examined. This substantial advantage in activity favoring SSZ-41x is observed despite the relatively similar distillate yields produced by each catalyst (FIG. 5). Large advantages in activity for one hydroprocessing catalyst over another are generally accompanied by a commensurate penalty in the form of lower HCR selectivity or product yields. Any such penalty is disproportionately weak in the specific case of the present SSZ-41x catalyst, suggesting that SSZ-41x may provide an inherent advantage in activity over MTW.

In summary, MTW and SSZ-41x catalysts were both proficient in generating middle distillates (380° F.-700° F. boiling point) with similar yields at equivalent conversion. The SSZ-41x catalyst, however, provides a substantial advantage over MTW in HCR activity.

The invention claimed is:

1. A process for producing distillate range hydrocarbons, comprising:
    contacting under hydroprocessing conditions a hydrocarbon feedstock with a hydroprocessing catalyst to form a hydroprocessed effluent, and
    fractionating the hydroprocessed effluent to recover one or more hydrocarbon fractions boiling in a range of diesel or jet fuel;
wherein the hydroprocessing catalyst comprises a carrier component and a metal component that is supported on the carrier component, wherein the carrier component comprises (i) a SSZ-41x zeolite in an amount of from 0.1 wt. % to 75 wt. %, based on the total weight of the carrier component (ii) an amorphous silica-alumina in an amount of from 15 wt. % to 85 wt. %, based on the total weight of the carrier component, and (iii) an alumina binder in an amount of from 5 wt. % to 55 wt. %, based on the total weight of the carrier component; wherein the metal component comprises a Group 6 metal and a Group 8-10 non-noble metal.

2. The process of claim 1, wherein the hydrocarbon feed comprises at least 10 wt. % of a biocomponent.

3. The process of claim 2, wherein the biocomponent is derived from hydrodeoxygenation of a renewable oil.

4. The process of claim 1, wherein the hydrocarbon feed comprises at least 40 wt. % n-paraffins.

5. The process of claim 1, wherein the hydroprocessing conditions include a reaction temperature of from 300° C. to 500° C.; a total pressure of from 6 MPa to 30 MPa; a hydrogen feed rate of from 800 SL/L to 2000 SL/L; and a liquid hourly space velocity of from 0.1 $h^{-1}$ to 10 $h^{-1}$.

6. The process of claim 1, wherein the SSZ-41x zeolite has a $SiO_2/Al_2O_3$ molar ratio of from 30 to less than 100 and $SiO_2/ZnO$ molar ratio of from 15 to 75.

7. The process of claim 1, wherein the MTW and/or SSZ-41x zeolite is present in an amount of from 0.5 wt. % to 25 wt. %, based on the total weight of the carrier component.

8. The process of claim 1, wherein the amorphous silica-alumina is present in an amount of from 50 wt. % to 80 wt. %, based on the total weight of the carrier component.

9. The process of claim 1, wherein the amorphous silica-alumina, prior to incorporation into the carrier component, has one or more of the following properties: a total pore volume of from 0.5 $cm^3/g$ to 2.0 $cm^3/g$; an average pore diameter of from 4 nm to 14 nm; and a BET surface area of from 400 $m^2/g$ to 550 $m^2/g$.

10. The process of claim 1, wherein alumina binder is present in an amount of from 15 wt. % to 35 wt. %, based on the total weight of the carrier component.

11. The process of claim 1 wherein the Group 6 metal is present in an amount of from 5 to 40 wt. %, expressed as an oxide based on the total weight of the catalyst.

12. The process of claim 1 wherein the Group 8-10 metal is present in an amount of from 1 to 10 wt. %, expressed as an oxide based on the total weight of the catalyst.

13. The process of claim 1 wherein the Group 6 metal is selected from molybdenum and/or tungsten and the Group 8-10 metal is selected from cobalt and/or nickel.

14. The process of claim 1, wherein the hydroprocessing catalyst further comprises an organic dispersion agent having from 2 to 10 carbons and having a ratio of carbon atoms to oxygen atoms of from 0.6 to 2.

15. The process of claim 14, wherein the organic additive is selected from citric acid, gluconic acid, nitrilotriacetic acid, ethylene glycol, or any combination thereof.

16. The process of claim 1, wherein the hydroprocessing catalyst further comprises phosphorus in an amount of from 1 to 10 wt. %, calculated as $P_2O_5$ and based on the total weight of the catalyst.

17. The process of claim 1, wherein the hydroprocessing catalyst is further sulfided under sulfiding conditions prior to contacting the hydrocarbon feedstock with the hydroprocessing catalyst.

18. The process of claim 1, wherein the diesel or jet fuel is used as a drop-in fuel composition or blended with an existing fuel composition.

* * * * *